(12) United States Patent
Oh

(10) Patent No.: US 12,371,011 B2
(45) Date of Patent: Jul. 29, 2025

(54) APPARATUS FOR CONTROLLING A VEHICLE, A SYSTEM HAVING THE SAME, AND A METHOD FOR THE SAME

(71) Applicants: HYUNDAI MOTOR COMPANY, Seoul (KR); KIA CORPORATION, Seoul (KR)

(72) Inventor: Tae Dong Oh, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 279 days.

(21) Appl. No.: 17/592,577

(22) Filed: Feb. 4, 2022

(65) Prior Publication Data

US 2022/0410883 A1 Dec. 29, 2022

(30) Foreign Application Priority Data

Jun. 29, 2021 (KR) ........................ 10-2021-0084942

(51) Int. Cl.
*B60W 30/095* (2012.01)
*B60W 60/00* (2020.01)

(52) U.S. Cl.
CPC ..... *B60W 30/0956* (2013.01); *B60W 60/0027* (2020.02); *B60W 2552/10* (2020.02); *B60W 2554/4041* (2020.02); *B60W 2554/4046* (2020.02); *B60W 2554/80* (2020.02);
(Continued)

(58) Field of Classification Search
CPC ......... B60W 30/0956; B60W 60/0027; B60W 2552/10; B60W 2554/4041; B60W 2554/4046; B60W 2554/80; B60W 2555/60; B60W 2556/40; B60W 2720/10; B60W 50/0097; B60W 2552/53; B60W 2556/50; B60W 30/16; B60W 30/14; B60W 30/10; B60W 30/12; B60W 30/143; B60W 30/18163; B60W 40/06; B60W 40/10; B60W 40/105; B60W 50/0098; B60W 60/0011; B60W 2552/00; B60W 2552/50;
(Continued)

(56) References Cited

U.S. PATENT DOCUMENTS

2009/0212930 A1* 8/2009 Pfeiffer .................. G08G 1/167
701/41
2018/0339709 A1* 11/2018 Tiwari ................ B60W 50/082
2020/0410260 A1* 12/2020 Choe ..................... B60W 40/02
(Continued)

OTHER PUBLICATIONS

Basma Khelfa, "Extended Longitudinal Motion Planning for Autonomous Vehicles on Highways Including Lane Changing Prediction," Springer Proceedings in Physics, pp. 496 and 501. (Year: 2020).*

*Primary Examiner* — Anshul Sood
(74) *Attorney, Agent, or Firm* — Lempia Summerfield Katz LLC

(57) ABSTRACT

Disclosed are an apparatus for controlling a vehicle, a system including the apparatus, and a method for controlling the apparatus. The apparatus includes: a reference lane calculator to calculate a reference lane based on a traveling condition of the vehicle; a target determining device to determine a target of interest based on the reference lane and a predicted path of an object around the vehicle; and a control parameter calculating device to calculate a control parameter of the vehicle based on a traveling state of the target of interest.

16 Claims, 18 Drawing Sheets

(52) U.S. Cl.
    CPC ..... *B60W 2555/60* (2020.02); *B60W 2556/40* (2020.02); *B60W 2720/10* (2013.01)

(58) Field of Classification Search
    CPC ........ B60W 2554/40; B60W 2720/103; B60Y 2400/30
    See application file for complete search history.

(56) References Cited

U.S. PATENT DOCUMENTS

2021/0253107 A1* 8/2021 Takamatsu ...... B60W 30/18163
2021/0349463 A1* 11/2021 Kurotobi ......... B60W 30/18145

* cited by examiner

APPARATUS FOR CONTROLLING A VEHICLE, A SYSTEM HAVING THE SAME, AND A METHOD FOR THE SAME

CROSS-REFERENCE TO RELATED APPLICATION

This application claims the benefit of and priority to Korean Patent Application No. 10-2021-0084942, filed on Jun. 29, 2021, the entire contents of which are incorporated herein by reference.

TECHNICAL FIELD

The present disclosure relates to an apparatus for controlling a vehicle, a system including the same, and a method for the same.

BACKGROUND

In general, an autonomous vehicle travels at a set speed limit in each section in an autonomous driving mode without an input from a driver of the vehicle. In addition, several traveling profiles (patterns) are generated to determine a longitudinal traveling speed during autonomous driving, and one profile is selected among the traveling profiles. In a city or on highway having a large amount of traffic, many vehicles around the autonomous vehicle may cut in a lane in which the autonomous driving vehicle travels, or cut out toward another lane. In this situation, a traveling manner including a traveling path or a stop distance of the autonomous driving vehicle may be changed due to the vehicles cutting in the lane, or cutting out of the lane. In other words, the autonomous driving vehicle has to be controlled in a proper traveling manner to be matched with the traveling situation of surrounding vehicles.

A conventional autonomous driving vehicle has determined whether to cut in a lane or cut out of the lane, on the assumption that a road has a typical shape characterized in that a lane is continuous, a lane width is constant, and a curvature is within a limit range. However, the above manner causes an error in determining the traveling state of the surrounding vehicle, when the lane is discontinuous, the lane width is not constant, or a road has an unusual section having a U-turn or a circular shape.

SUMMARY

The present disclosure has been made to solve the above-mentioned problems occurring in the prior art while advantages achieved by the prior art are maintained intact.

An aspect of the present disclosure provides an apparatus for controlling a vehicle, capable of deriving a virtual lane by effectively utilizing a laneside, a lanelink, or a control path and comparing predicted paths and predicted positions of surrounding vehicles to determine a target of interest, thereby more exactly determining the target and strongly coping with various road shapes and a traveling state of a surrounding vehicle, a system including the same, and a method for the same.

Another aspect of the present disclosure provides an apparatus for controlling a vehicle, capable of calculating a control point proportional to a ratio of cut-out in progression between a target of interest and a preceding vehicle, thereby improving performance corresponding to the cut-out, and improving ride quality with respect to a road having a random shape, a system including the same, and a method for the same.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, an apparatus for controlling a vehicle may include: a reference lane calculator configured that calculates a reference lane, based on a traveling condition of a vehicle, a target determining device that determines a target of interest based on the reference lane and a predicted path of an object around the vehicle, and a control parameter calculating device that calculates a control parameter of a vehicle, based on a traveling state of the target of interest.

According to an embodiment, the reference lane calculator may calculate the reference lane based on at least one of a first lane generated to have a specific width based on a lanelink corresponding to the center of the vehicle, a second lane based on a laneside which is a lane formed on a map of an area in which the vehicle is traveling, or a third lane based on a traveling path of the vehicle.

According to an embodiment, the reference lane calculator may calculate the reference lane based on a laneside in a section uniform in a lane on which the vehicle is traveling, may calculate the reference lane based on a lanelink in a section in which a width of the lane is changed, or the number of lanes is changed, and may calculate the reference lane based on a traveling path of the vehicle when the vehicle changes a lane.

According to an embodiment, the target of interest may include a cut-out object which deviates from the reference lane.

According to an embodiment, the target determining device may determine the target of interest by considering a predicted position of the vehicle after a specific time.

According to an embodiment, the target determining device may select an object, which is within a specific distance from a traveling path of the vehicle, as a candidate object, and may determine a target of interest based on a predicted path of the candidate object.

According to an embodiment, the target determining device may determine the target of interest by considering cross information between predicted paths of objects around the vehicle.

According to an embodiment, the target determining device may determine the target of interest based on information on a signal of a traffic light provided around the vehicle.

According to an embodiment, the control parameter calculating device may select a control reference point for controlling the speed of the vehicle on the traveling path of the vehicle, and may calculate a control parameter of the vehicle, based on the selected control reference point.

According to an embodiment, the control parameter calculating device may calculate the control reference point based on a ratio that the target of interest deviates from the traveling path of the vehicle.

According to an embodiment, the control reference point may be shifted toward a preceding object of the target of interest, depending on a ratio that the target of interest enters a target lane, to which the target of interest cuts out, based on the center of a traveling lane of the vehicle and the center of the target lane.

According to an embodiment, the control parameter calculating device may calculate a control parameter of the vehicle, based on a control reference point of the target of interest and a control reference point of the preceding object of the target of interest.

According to an embodiment, the control parameter calculating device may calculate the control parameter based on a point which internally divides a straight line from the control reference point of the target of interest to the control reference point of the preceding object of the target of interest.

According to an embodiment, the control parameter calculating device may calculate the control parameter of the vehicle, based on the distance from the vehicle to the control reference point and a speed component of an object at the control reference point According to an embodiment, the control parameter calculating device may generate a speed profile which is a set of target speeds of the vehicle at each time, based on the traveling state of the target of interest According to an embodiment, the control parameter calculating device may calculate a point-level path of a vehicle, based on the traveling state of the target of interest.

According to an embodiment of the present disclosure, a vehicle system may include a sensor that detects an object around a vehicle, an information acquiring device that acquires information of a position of the vehicle and information of a map of the vehicle, and a vehicle control apparatus that calculates a reference lane, based on the object around the vehicle, the information on the position of the vehicle, and the information on the map of the vehicle, determines a target of interest based on the reference lane and a predicted path of an object around the vehicle, and controls the vehicle based on the control parameter of the vehicle, which is calculated based on the traveling state of the target of interest.

According to an embodiment, the sensor may detect information on the traveling state of the vehicle.

According to an embodiment, the information acquiring device may acquire the information on the position of the vehicle and the information on the map of the vehicle, from an external server.

According to an embodiment, the vehicle control apparatus may calculate the reference lane based on an image acquired from the sensor.

According to another aspect of the present disclosure, a method for controlling a vehicle includes: calculating a reference lane based on a traveling condition of a vehicle, determining a target of interest based on the reference lane and a predicted path of an object around the vehicle, and calculating a control parameter of the vehicle, based on a traveling state of the target of interest.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The above and other objects, features and advantages of the present disclosure should be more apparent from the following detailed description taken in conjunction with the accompanying drawings.

Figure 1:
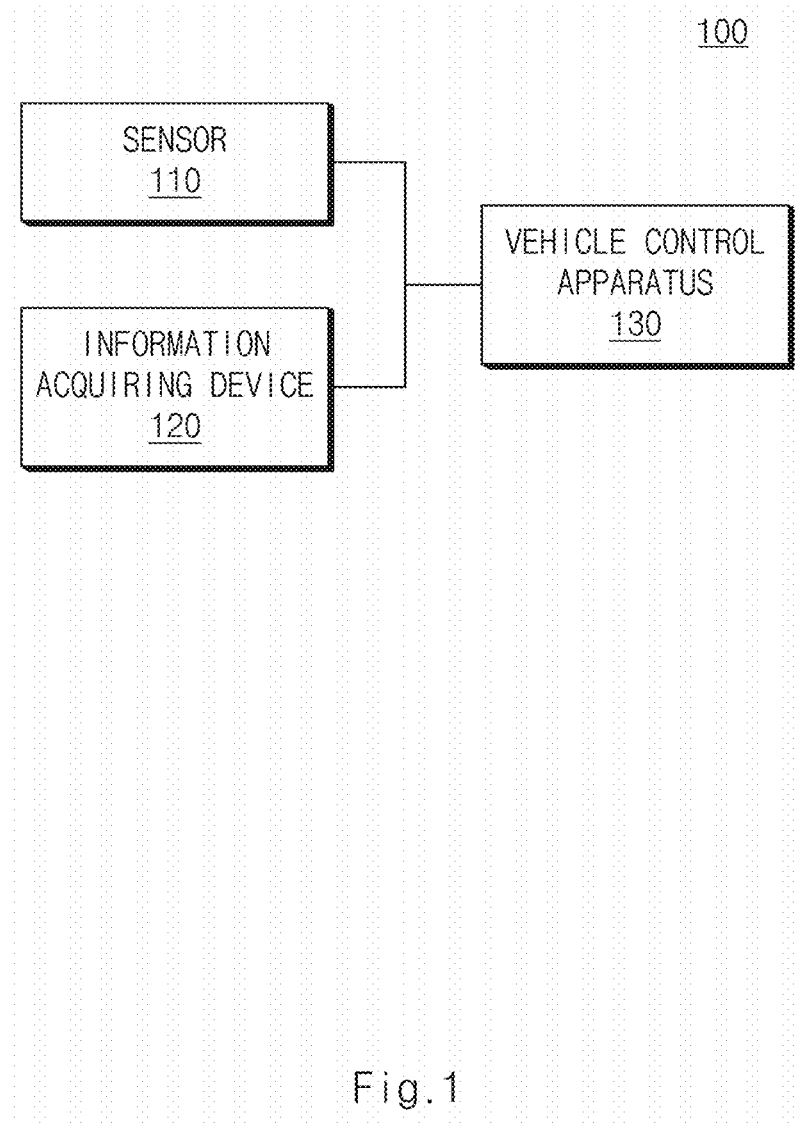
FIG. 1 is a block diagram illustrating the configuration of a vehicle system including an apparatus for controlling a vehicle, according to an embodiment of the present disclosure.

The drawings described herein are for illustration purposes only and are not intended to limit the scope of the present disclosure in any way.

DETAILED DESCRIPTION

Hereinafter, some embodiments of the present disclosure are described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions are ruled out in order not to unnecessarily obscure the gist of the present disclosure.

In addition, in the following description of components according to an embodiment of the present disclosure, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

When a component, device, element, or the like of the present disclosure is described as having a purpose or performing an operation, function, or the like, the component, device, or element should be considered herein as being "configured to" meet that purpose or perform that operation or function.

Hereinafter, embodiments of the present disclosure are described in detail with reference to FIGS. 1 to 12.

FIG. 1 is a block diagram illustrating the configuration of a vehicle system including an apparatus for controlling a vehicle, according to an embodiment of the present disclosure.

Referring to FIG. 1, a vehicle system 100 according to an embodiment of the present disclosure may be implemented inside a vehicle. In this case, the apparatus 130 for controlling the vehicle may be implemented integrally with internal control units of the vehicle. Alternatively, the apparatus 130 for controlling the vehicle may be implemented separately from the internal control units of the vehicle and may be connected with the internal control units of the vehicle through an additional connection unit.

In addition, referring to FIG. 1, according to an embodiment of the present disclosure, the vehicle system 100 may include a sensor 110, an information acquiring device 120, and the apparatus (vehicle control apparatus) 130 for controlling a vehicle.

The sensor 110 may detect an object around the vehicle. The sensor 110 may detect the distance to the object, such as a front vehicle, a road sign, or an obstacle, in front of the vehicle, and the relative speed to the object. For example, the sensor 110 may include a camera, a light detection and ranging (LIDAR) sensor, or a radio detection and ranging (RADAR) sensor.

In addition, the sensor 110 may detect information on the states of various actuators in the vehicle. For example, the information on the states of the various actuators in the vehicle may include the speed, the acceleration, or the angular speed of the vehicle.

The information acquiring device 120 may acquire information on a position of the vehicle and information on a map of the vehicle. For example, the information acquiring device 120 may acquire information on a current position of the vehicle through a global positioning system (GPS), and may acquire map information including the curvature of a road, on which the vehicle is traveling, and a position of a current lane of the vehicle. In this case, the information acquiring device 120 may store the map information in an additional storage (not illustrated), and may receive the information (position information) on the position of the vehicle or the information (map information) on the map of the vehicle from an external server through a communication device (not illustrated).

The vehicle control apparatus 130 may calculate a reference lane, based on an object around the vehicle, position information of the vehicle, and the map information of the vehicle. The vehicle control apparatus 130 may calculate the reference lane based on an image obtained from the sensor 110 (for example, a camera) when the map information may not be acquired due to construction or an accident. In addition, the vehicle control apparatus 130 may determine a target of interest, based on the reference lane, and a predicted path of the object around the vehicle and may control the vehicle based on a control parameter of the vehicle, which is calculated based on the traveling state of the target of interest.

Hereinafter, the detailed function of the vehicle control apparatus 130 is described in detail with reference to FIG. 2.

Figure 2:
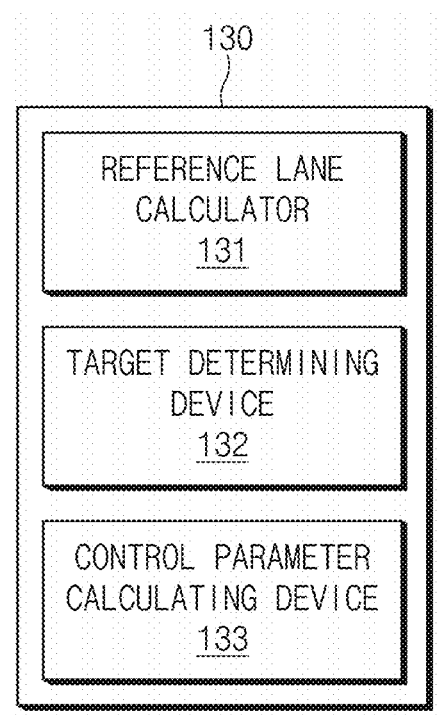
FIG. 2 is a block diagram illustrating the configuration of an apparatus for controlling a vehicle, according to an embodiment of the present disclosure.

FIG. 2 is a block diagram illustrating the configuration of a vehicle control apparatus, according to an embodiment of the present disclosure.

Referring to FIG. 2, according to an embodiment of the present disclosure, the vehicle control apparatus 130 may include a reference lane calculator 131, a target determining device 132, and a control parameter calculating device 133.

The reference lane calculator 131 may calculate a reference lane based on a traveling condition of a vehicle. In this case, according to an embodiment of the present disclosure, the reference lane may be a virtual lane serving as a reference for determining a target of interest, which is a surrounding object exerting an influence on the traveling of the vehicle. In this case, the reference lane calculator 131 may calculate the reference lane based on a first lane generated to have a specific width based on a lanelink corresponding to the center of the vehicle, a second lane based on a laneside which is a lane formed on a map of an area in which the vehicle is traveling, and a third lane based on the traveling path of the vehicle. In addition, the reference lane calculator 131 may calculate the reference lane by properly combining the first lane to the third lane.

For example, the reference lane calculator 131 may calculate the reference lane, based on the laneside in a section uniform in a lane on which a vehicle is currently traveling. In addition the reference lane calculator 131 may calculate the reference lane, based on the lanelink in an irregular section in which the width of the lane, in which a vehicle is currently traveling, is greater than or smaller than a reference value, or the number of lanes is changed. When a path is changed (e.g., when the vehicle changes a lane), the reference lane calculator 131 may calculate the reference lane based on the traveling path of the vehicle.

The target determining device 132 may determine the target of interest, based on the reference lane and the predicted path of a surrounding object around the vehicle. In this case, the target of interest may include an object exerting an influence on the vehicle traveling, that is, a cut-out vehicle which deviates from the reference lane. In addition, the target determining device 132 may determine the target of interest by considering a predicted position of the vehicle traveling and a predicted position of the surrounding object after a specific time.

The target determining device 132 may select an object, which is within a specific distance from the traveling path of the vehicle, as a candidate object, and may determine a target of interest based on the predicted path of the candidate object. For example, among candidate objects adjacent to the traveling path of the vehicle, the target determining device 132 may determine, as the target of interest, an object (for example, a cut-out object) exerting an influence on the traveling path of the vehicle by using the predicted path of the candidate objects.

The target determining device 132 may determine the target of interest by considering cross information between predicted paths of objects around the vehicle. In other words, the target determining device 132 may determine the target of interest by considering that predicted paths of objects overlap with each other, or objects interfere with each other or collide with each other, on the assumption that the objects are around the vehicle. For example, when a specific object tries to cut out of a lane and another object is traveling on the cut-out lane, the object may stop cutting out of the lane. As described above, the target determining device 132 may determine the target of interest by considering predicted paths of a plurality of objects together.

In addition, the target determining device 132 may determine the target of interest based on information on a signal of a traffic light provided around the vehicle. For example, when the vehicle is on a left-turning lane, the vehicle may determine a predicted path of an object on the same lane as a left turn, because the object may turn left depending on the left-turn signal of a traffic light, even if the object is determined to travel straight, based on information such as a speed. As described above, the target determining device 132 may consider signal information of the traffic light, when calculating the predicted path of the object.

The control parameter calculating device 133 may calculate a control parameter of a vehicle, based on the traveling state of the target of interest. For example, the control parameter calculating device 133 may generate a speed profile which is a set of target speeds of the vehicle at each time, based on the traveling state of the target of interest. In addition, the control parameter calculating device 133 may calculate a point-level path of a vehicle, based on the traveling state of the target of interest.

In detail, the control parameter calculating device 133 may select a control reference point for controlling the speed of the vehicle on the traveling path of the vehicle, and may calculate a control parameter (for example, a control parameter of a lateral speed) of the vehicle, based on the selected control reference point. In this case, the control reference point may be a target reference point for controlling the speed of the vehicle.

For example, the control parameter calculating device 133 may calculate the control reference point based on a ratio that the target of interest deviates from the traveling path of the vehicle. In this case, the target of interest exerts a greater influence on the traveling of the vehicle, as the target of interest approaches the traveling rout of the vehicle. Accordingly, as the target of interest deviates from the traveling path of the vehicle at a greater ratio, the control reference point is farther away from the vehicle.

Meanwhile, when a preceding object of the target of interest is present, the control parameter calculating device 133 may calculate the control parameter of the vehicle, based on a control reference point of the target of interest and a control reference point of the preceding object of the target of interest. In this case, the control parameter calculating device 133 may calculate the control parameter, based on a point which internally divides a straight line from the control reference point of the target of interest to the control reference point of the preceding object of the target of interest.

For example, when the target of interest cuts out of the traveling path by 40%, the control parameter calculating device 133 may select the control reference point to a point which internally divides a line from the target of interest and the preceding object of the target of interest by 4:6.

In addition, the control parameter calculating device 133 may calculate the control parameter of the vehicle, based on the distance from the vehicle to the control reference point and a speed component of an object at the control reference point. In this case, the control parameter calculating device 133 may calculate the control parameter, based on a scalar value obtained by projecting a speed vector of each object at the position of the control reference point on the traveling path of the vehicle. As described above, the control parameter calculating device 133 may calculate the control parameter of the vehicle by considering the distance component and the speed component for the control reference point.

Hereinafter, the detailed function of each component of the vehicle control apparatus 130 is described in detail with reference to FIGS. 3 to 10.

As described above, according to an embodiment of the present disclosure, the vehicle control apparatus 130 may derive a virtual lane by effectively utilizing a laneside, a lanelink, and a control path, and comparing predicted paths and predicted positions of surrounding objects to determine a target of interest, thereby more exactly determining the target and strongly coping with various road shapes and a traveling state of a surrounding vehicle.

In addition, according to another embodiment of the present disclosure, the vehicle control apparatus 130 may calculate a control point proportional to a ratio of cut-out in progression between a target of interest and a preceding vehicle, thereby improving performance corresponding to the cut-out and improving ride quality with respect to a road having a random shape.

Figure 3A:
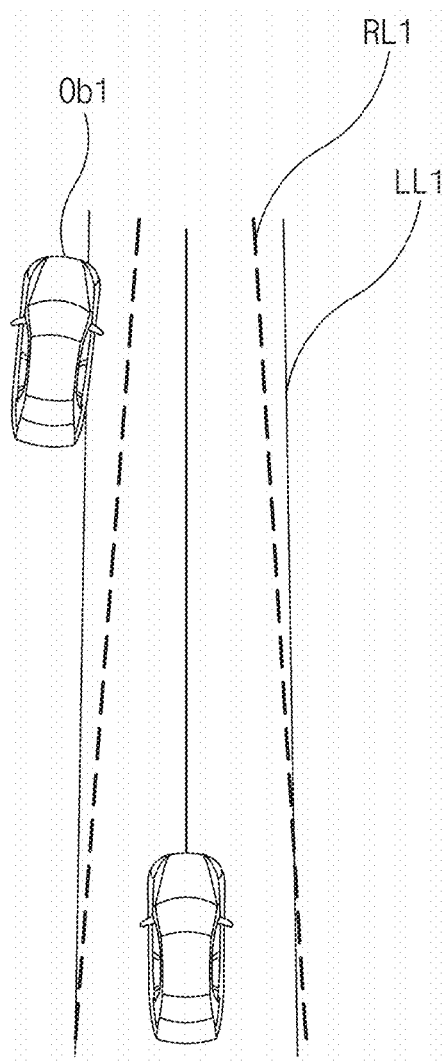
FIGS. 3A and 3B are views illustrating a method for setting various reference lanes.
Figure 3B:
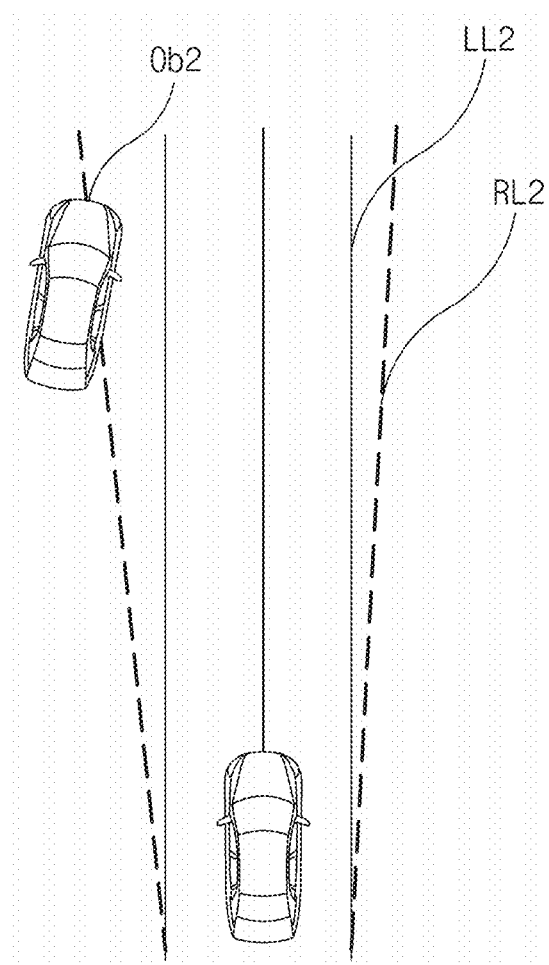

FIGS. 3A and 3B are views illustrating a method for setting various reference lanes.

Referring to FIGS. 3A and 3B, "RL1" and "RL2" indicate real lanes, and "LL1" and "LL2" indicate reference lanes generated based on a lanelink. In addition, FIG. 3A shows a case in which the width of the real lane "RL1" is gradually narrowed, and FIG. 3B shows a case in which the width of the real lane RL2 is gradually widened.

As illustrated in FIGS. 3A and 3B, although there is no significant difference in the actual city center when viewed with the naked eye, a lane width may not be often constant, that is, the lane width may be narrowed or widened. For example, on the assumption that the lane width is 3 m at the position of the vehicle on the lane, while the lane width is 3.3 m at 50 m ahead, the change of the lane width may not be sensed with the naked eye.

For example, as illustrated in FIG. 3A, even though a vehicle "Ob1" in front of a left side does not actually enter inward of the real lane RL1, a vehicle "C1" may be controlled to be decelerated, so an erroneous detection may occur. As illustrated in FIG. 3B, even though a vehicle "Ob2" in front of a left side enters inward of the real lane "RL2", a vehicle "C2" may not be controlled to be decelerated, so non-detection may occur.

Accordingly, when the lane width is greater than a safe margin for the vehicles "C1" and "C2" to pass through, an object (cut-out object) to cut out may be determined based on the laneside. In detail, according to an embodiment of the present disclosure, the vehicle control apparatus 130 may basically use the reference lane based on the laneside, and may use the reference lane (having the same width) based on the lanelink in a place, such as a pocket lane, having an irregular laneside section, or a section having a larger lane width. In addition, when the lane is changed, the reference lane based on a point-level path may be used.

Figure 4A:
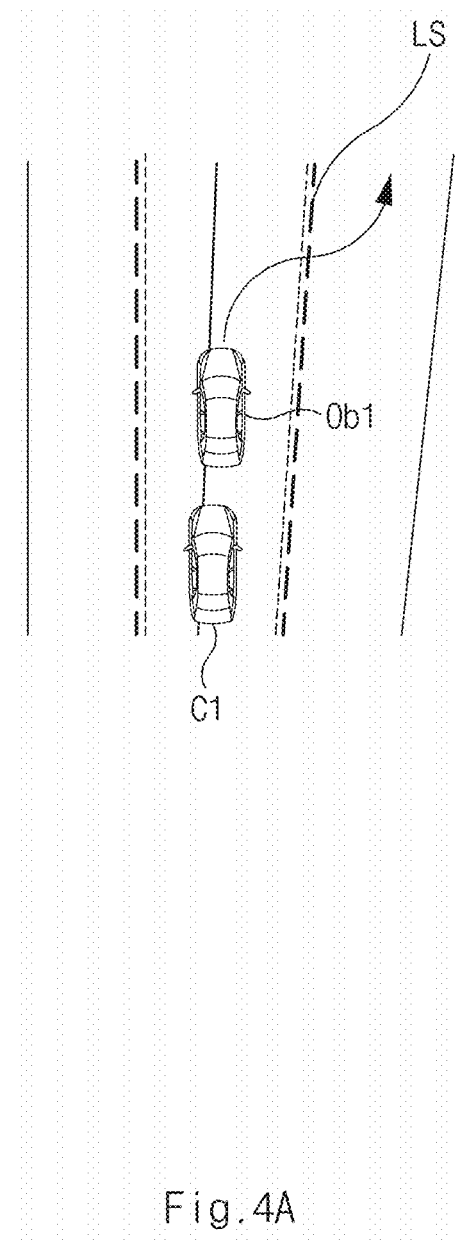
FIGS. 4A and 4B are views illustrating a method for setting a reference lane of an apparatus for controlling a vehicle, according to an embodiment of the present disclosure.
Figure 4B:
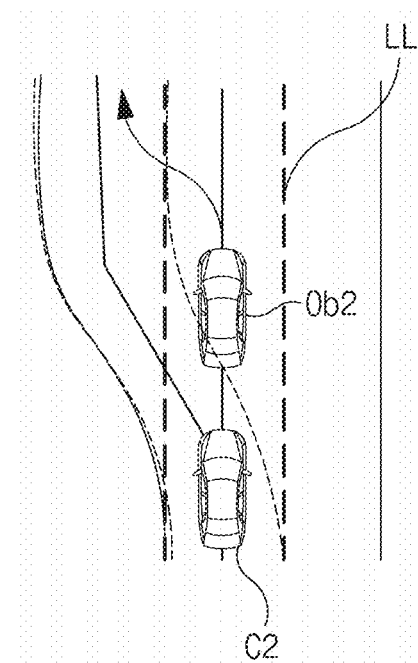

FIGS. 4A and 4B are views illustrating a method for setting a reference lane of a vehicle control apparatus, according to an embodiment of the present disclosure.

Referring to FIGS. 4A and 4B, "LS" indicates a reference lane generated based on the laneside, and "LL" indicates a reference lane generated based on the lanelink. In addition, FIG. 4A illustrates a lane in a general city, and FIG. 4B illustrates a pocket lane of extending a lane.

As illustrated in FIG. 4A, according to an embodiment of the present disclosure, the vehicle control apparatus 130 determines whether a surrounding vehicle cut outs, by employing a real lane as Ground Truth (GT) under a general city traveling condition. Accordingly, when the reference lane (LS) is utilized based on the laneside, the accuracy of the determination may be more improved.

Meanwhile, as illustrated in FIG. 4B, in the pocket road having a discrete lane and an irregular laneside shape, the determination may be easier by using virtual reference lane having a specific distance from the central line of a lane, rather than the determination based on a lane. In other words, referring to FIG. 4B, in the pocket road, the accuracy of the determination may be more enhanced, when the reference lane "LL" based on the lanelink is used.

FIG. 5 is a view illustrating that a reference lane is set based on a traveling path in a vehicle control apparatus, according to an embodiment of the present disclosure.

Figure 5A:
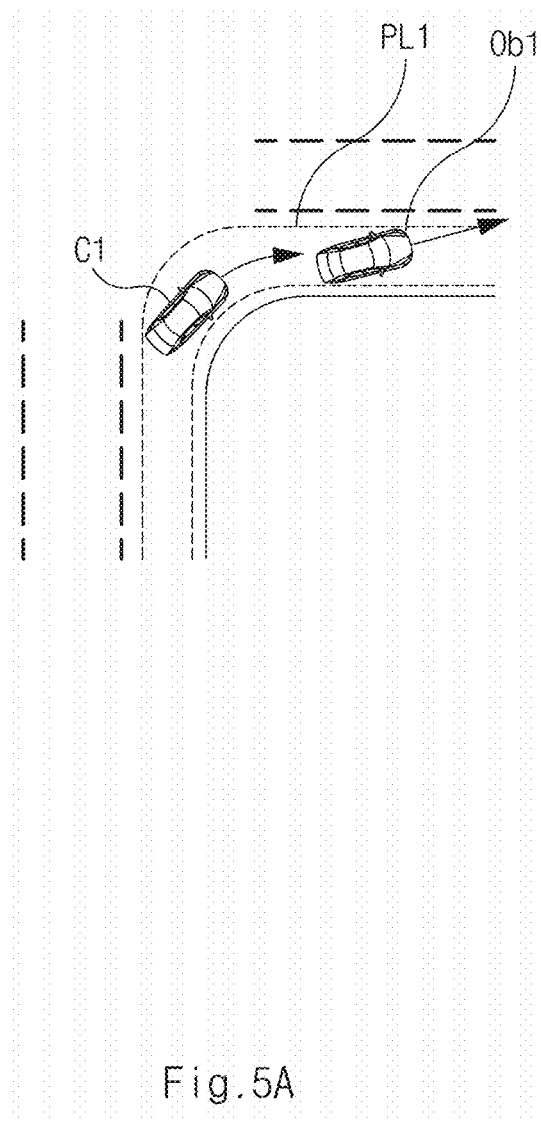
FIGS. 5A, 5B and 5C are views illustrating that a reference lane is set based on a traveling path in an apparatus for controlling a vehicle, according to an embodiment of the present disclosure.
Figure 5B:
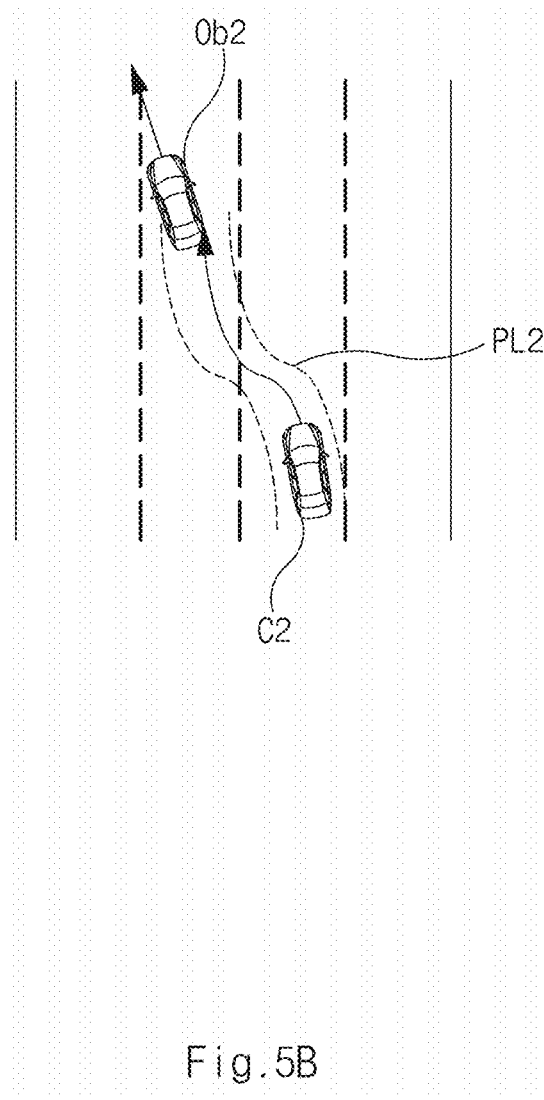
Figure 5C:
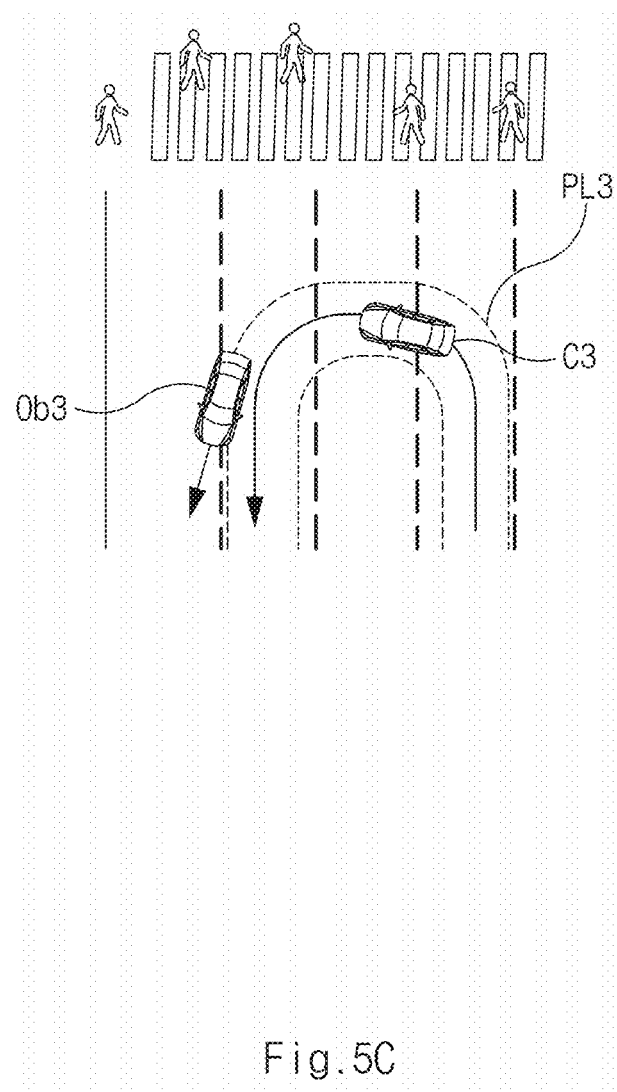

Referring to FIGS. 5A, 5B and 5C, "PL1" to "PL3" indicate reference lanes generated based on the traveling paths of vehicles "C1" to "C3" In addition, FIGS. 5A, 5B and 5C illustrate cases in which the vehicle turns right, makes a lane change, and makes a U-turn, respectively.

In general, under the traveling situations of a wider lane of an inner part of a crossroad or an area for a left/right turn, a P-turn, a U-turn, or a bus stop, a real lane is absent or the vehicles "C1" to "C3" may travel while being offset from the real lane even if the real lane is present. In this case, when the traveling path of the vehicle based on tracking control is calculated in a previous frame (that is, the step of calculating a previous period) by the vehicle control apparatus 130 according to an embodiment of the present disclosure, a cut-out target may be determined within a specific interval (for example, a point-level path) allowing the vehicles "C1" to "C3" to pass to the left and right of the relevant traveling path.

As described below, according to an embodiment of the present disclosure, the vehicle control apparatus 130 may use information on a previous frame, because of calculating point-level paths of the vehicles "C1" to "C3" at the final stage. Accordingly, in the stage in which the traveling strategies of the vehicles "C1" are not fixed (for example, the stage of determining making a lane change), the determination based on the laneside or the lanelink is performed, the determination is delayed in the relevant frame, or the determination based on the point-level path in the previous frame may be finally determined in a next frame. In the situation that the point-level paths of the vehicles "C1" to "C3" are continuously changed (for example, the situation that the path is corrected during lane changing), an integrated lane may be produced by considering the direction and the range that the point-level path is changed. In this case, the positions of the vehicles "C1" to "C3" may predicted on the point-level path, at each time.

Figure 6:
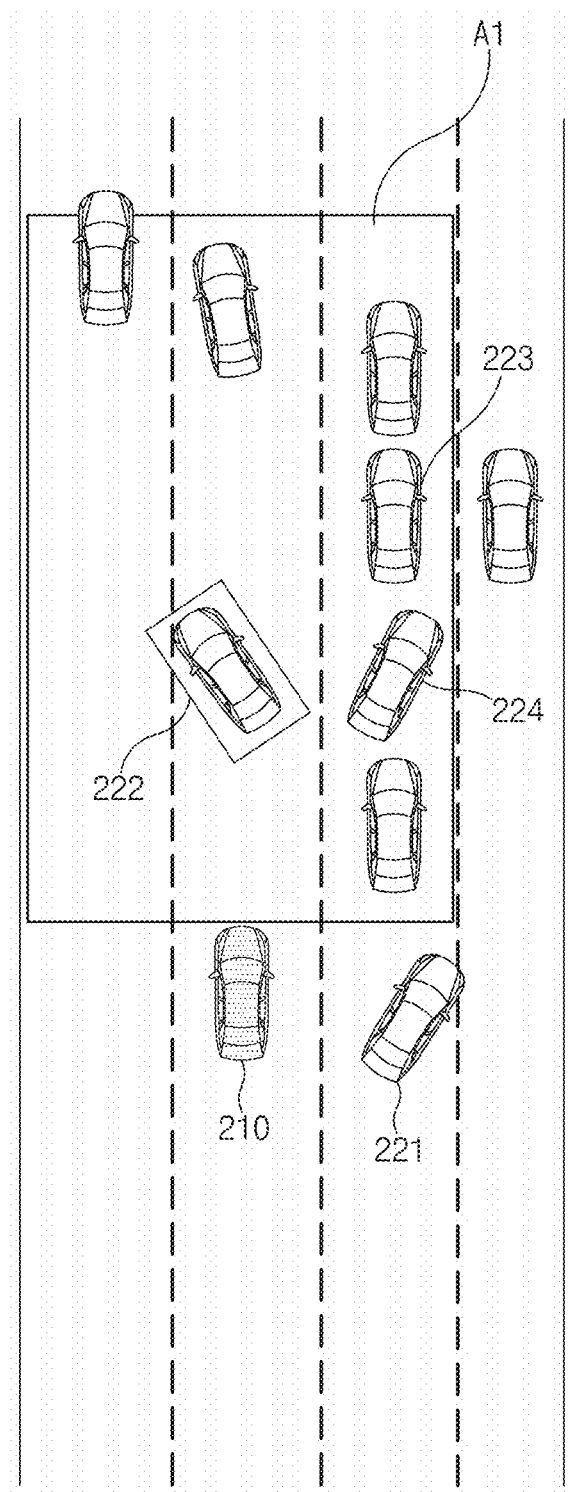
FIG. 6 is a view illustrating that a target of interest is determined in an apparatus for controlling a vehicle, according to an embodiment of the present disclosure.

FIG. 6 is a view illustrating that a target of interest is determined by a vehicle control apparatus, according to an embodiment of the present disclosure.

Referring to FIG. 6, according to an embodiment of the present disclosure, the vehicle control apparatus 130 needs to determine relative coordinates of a box of each object based on a reference lane to determine a target of interest (for example, a cut-out candidate object).

In FIG. 6, although a vehicle 221 is predicted to be present within an effective range of a vehicle 210, when the vehicle 210 is deceleration-controlled due to the vehicle 221 in back of the vehicle 210, the ride quality of the vehicle 210 may be degraded. Therefore, according to an embodiment of the present disclosure, the vehicle control apparatus 130 may set the target of interest till a front bumper of the vehicle 210 as illustrated in reference sign "A1" of FIG. 6. In addition, when the vehicle 221 actually tries to cut out thereafter, the cut-out of the vehicle 221 becomes irrelevant to the determination of the traveling pattern of the vehicle 210. Accordingly, the vehicle 210 may be excluded from a target of interest candidate.

In addition, in FIG. 6, a vehicle 222, which is highlighted, may be normally determined as a cut-out candidate object, based on the predicted path by the vehicle control apparatus 130, according to an embodiment of the present disclosure. Further, a vehicle 223 may not cut in a target lane in T seconds because another vehicle has already occupied the target lane. Accordingly, the vehicle 223 is excluded from the cut-out candidate object. Meanwhile, since a vehicle 224 may not be cut out because an inter-vehicle distance is not sufficiently ensured for cut-out as illustrated in FIG. 6, the vehicle 224 may be excluded from the cut-out candidate object. Accordingly, the vehicle 224 may be selected as the cut-out candidate object from a time point that the inter-vehicle distance is ensured thereafter.

Figure 7:
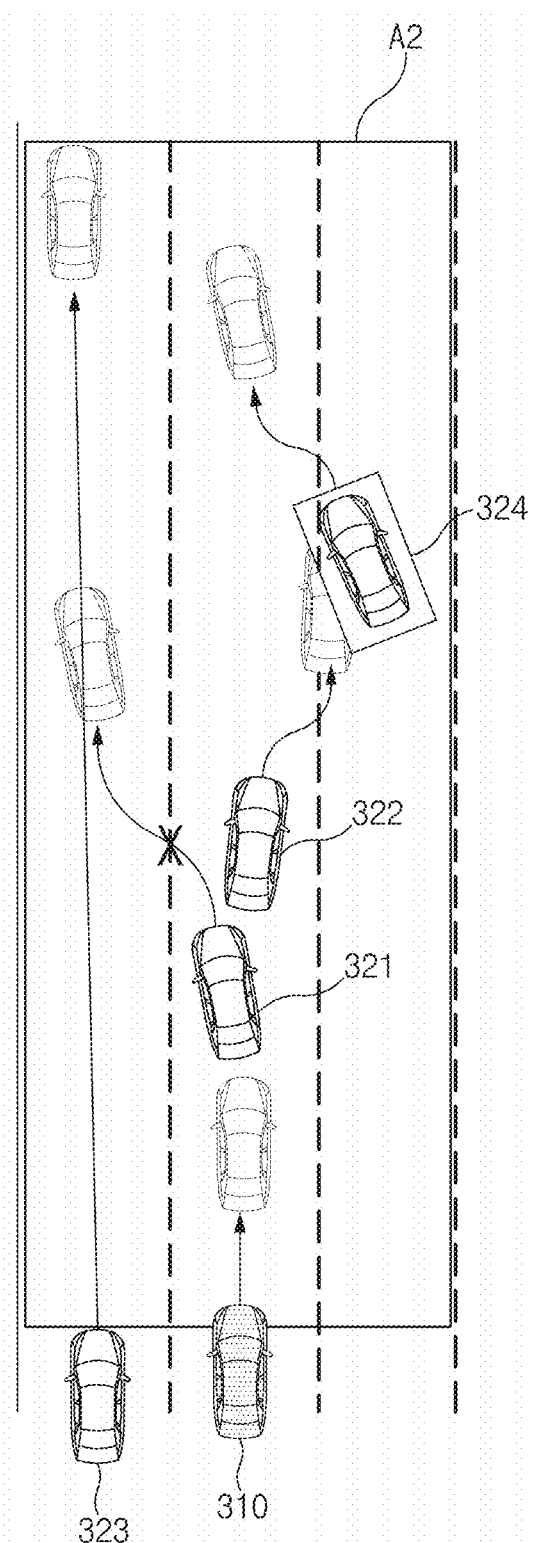
FIG. 7 is a view illustrating that a target of interest is determined in an apparatus for controlling a vehicle, according to an embodiment of the present disclosure.

FIG. 7 is a view illustrating that a target of interest is determined in a vehicle control apparatus, according to an embodiment of the present disclosure.

Referring to FIG. 7, according to an embodiment of the present disclosure, the vehicle control apparatus 130 needs to determine whether a relevant cut-out is actually an effective cut-out, by comparing future positions between surrounding vehicles, to determine the target of interest (for example, a cut-out candidate object).

As illustrated in FIG. 7, when a left vehicle 323 is traveling at a fast speed, a vehicle 321 may not cut out toward the left lane from a present lane with a higher probability. In this case, when the vehicle 321 is determined as a cut-out object, even though the vehicle 321 travels toward the left lane from the present lane, the determination may be failed.

In other words, the vehicle 321 may actually decelerate for a specific time, may stand by, and may try to cut out. Therefore, according to an embodiment of the present disclosure, the vehicle control apparatus 130 may determine that the vehicle 321 does not cut out in a current frame. Further, according to an embodiment of the present disclosure, the vehicle control apparatus 130 performs a computation every frame. Accordingly, the vehicle control apparatus 130 may change the determination for the vehicle 321 from an ineffective cut-out to an effective cut-out from a time point that a dangerous situation (that is, the situation that the vehicle 323 is traveling at a faster speed) is released, such that the vehicle 310 properly copes with that situation.

Meanwhile, as illustrated in FIG. 7, although the vehicle 322 has a predicted path overlapping a predicted path of the vehicle 324, the vehicle 322 does not collide with the vehicle 324 in the same frame. Accordingly, the vehicle control apparatus 130 may determine the vehicle 322 and the vehicle 324 to effectively cut out. In addition, according to an embodiment of the present disclosure, when the vehicle 310 is subordinate-controlled by the vehicle control apparatus 130, the vehicle 310 may not cope with that the vehicle 322 cuts out, and may determine the vehicle 324, which cuts out, as an in-pass vehicle in the subordinate-control.

Figure 8A:
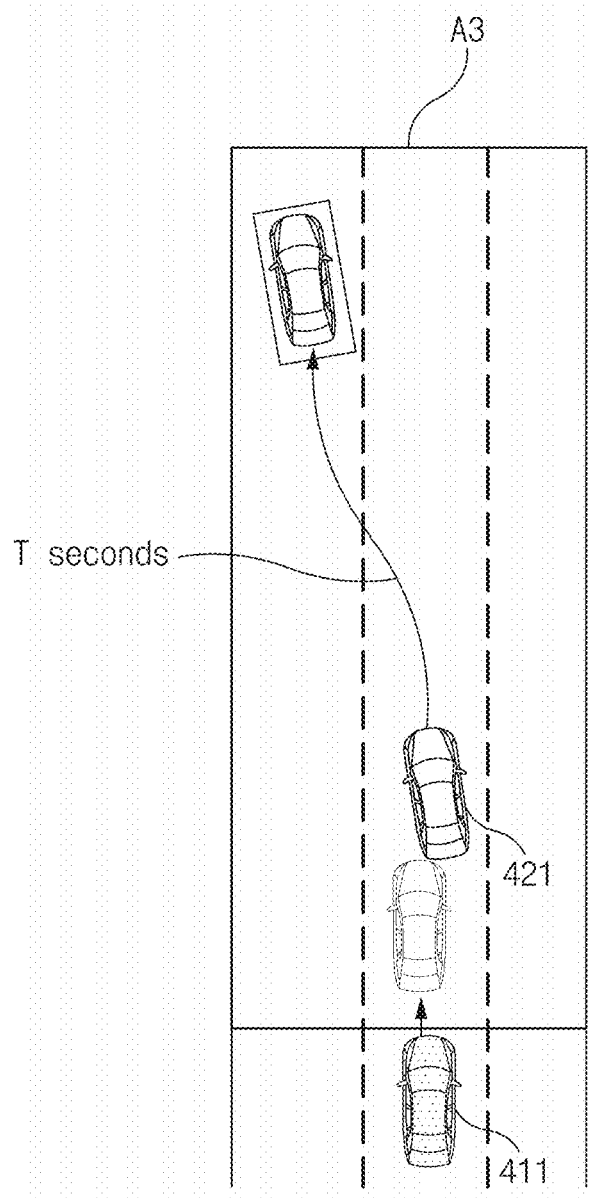
FIGS. 8A and 8B are views illustrating that a target of interest is determined in an apparatus for controlling a vehicle, according to an embodiment of the present disclosure.
Figure 8B:
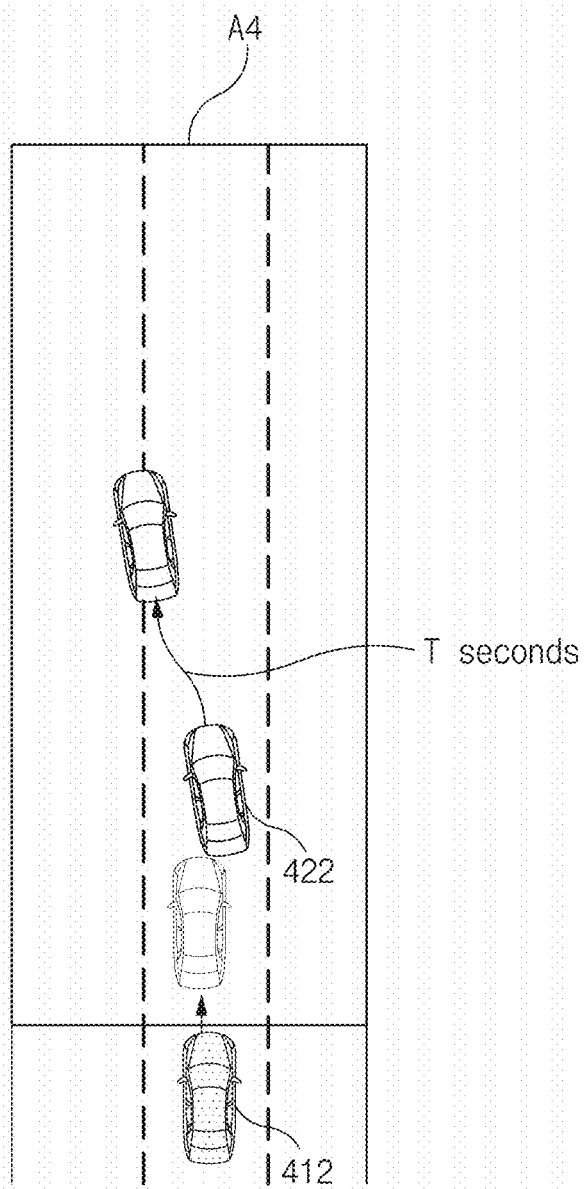

FIGS. 8A and 8B are views illustrating that a target of interest is determined in a vehicle control apparatus, according to an embodiment of the present disclosure.

Referring to FIG. 8A, a vehicle 421 may be determined as a cut-out object by the vehicle control apparatus 130 according to an embodiment of the present disclosure, because the vehicle 421 deviates from a present lane toward a target lane (that is, a left lane) after T seconds. Meanwhile, referring to FIG. 8B, a vehicle 422 is not determined as a cut-out object by the vehicle control apparatus 130 according to an embodiment of the present disclosure, because the vehicle 422 is still positioned in a current lane after T seconds.

In addition, although a vehicle 411 or a vehicle 412 may be in back, as the speed of the vehicle 411 or the speed of the vehicle 412 may be changed, the vehicle 411 or the vehicle 412 may cut out after "T" seconds differently from prediction. However, according to an embodiment of the present disclosure, the case may be determined again in a next frame, because the vehicle control apparatus 130 performs the computation every frame.

As described above, when the cut-out object is determined, even the predicted positions of the vehicles 411 and 412 have to be considered. In other words, the cut-out needs to be determined by systematically considering predicted positions of the surrounding vehicles 421 and 422 and predicted positions of the vehicles 411 and 412.

Figure 9:
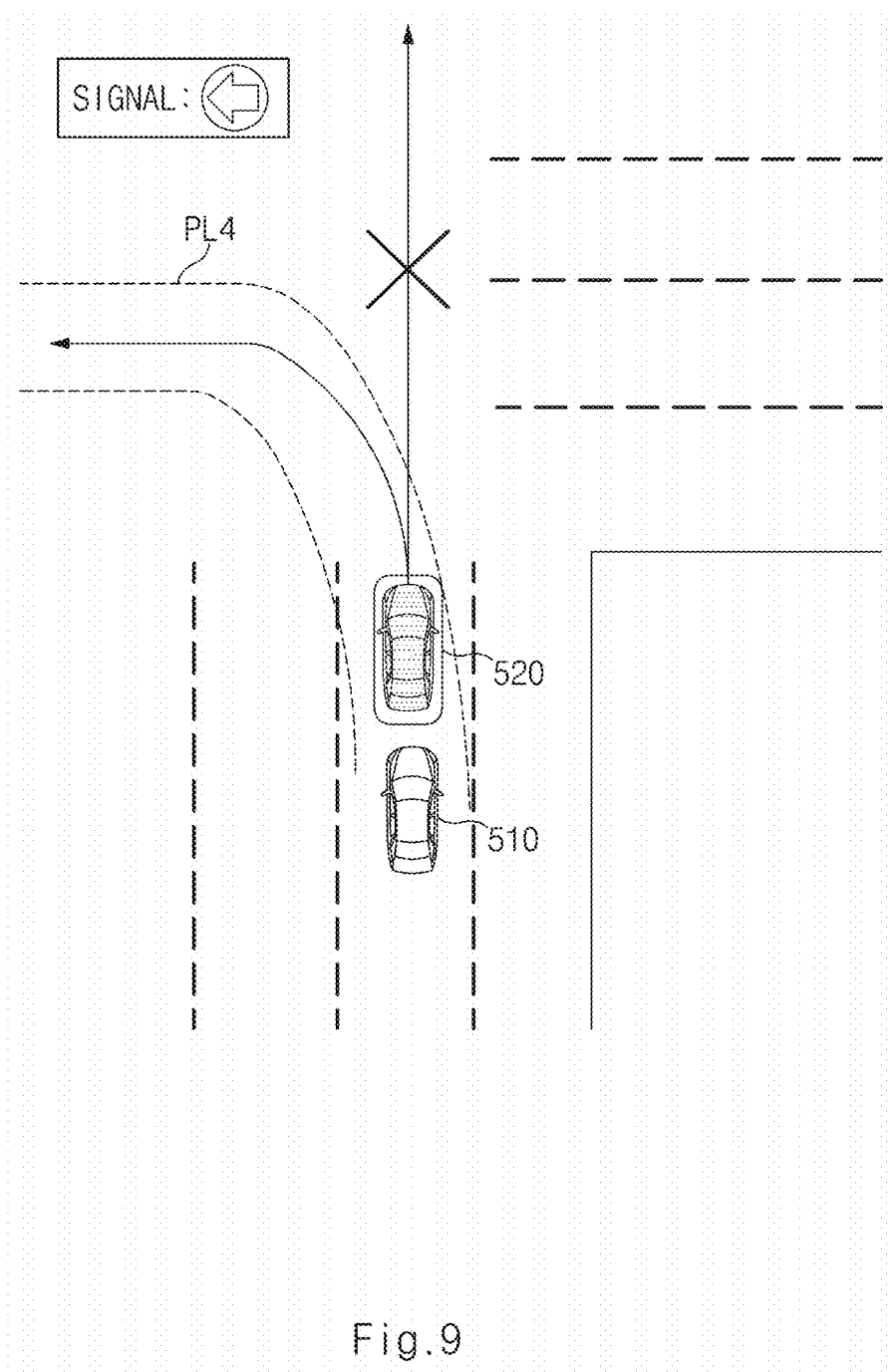
FIG. 9 is a view illustrating that a target of interest is determined based on signal information in an apparatus for controlling a vehicle, according to an embodiment of the present disclosure.

FIG. 9 is a view illustrating that a target of interest is determined based on signal information in a vehicle control apparatus, according to an embodiment of the present disclosure.

Referring to FIG. 9, a front vehicle 520 stopped on a left lane during a left-turn signal is determined to travel straight due to a predicted path resulting from a speed jump within an error range of the sensor 110. Accordingly, the front vehicle 520 may be erroneously determined to cut out on the current lane.

In this case, the erroneous determination of the straight path may be prevented by strictly changing a condition desired for determining cut-out toward a straight lane, when signal information of a traffic light indicates the left-turn signal. In this case, the signal information of the traffic light may be directly detected through the photographing of a camera provided in the vehicle system 100 or may be received from an external server. However, an exceptional situation that a vehicle travels while violating a signal rule without following the signal of the traffic light has to be sufficiently considered.

When situations that cut-out is intended occur beyond a threshold value based on a manner for adjusting a threshold value to be matched with a condition for determining cut-out, the vehicle control apparatus 130 may be set such that the determination for the cut-out is normal. For example, according to an embodiment of the present disclosure, the vehicle control apparatus 130 may ultimately determine a front vehicle 520 to cut out after continuously determining the front vehicle 520 to cut out for five frames under the situation that the front vehicle 520 follows a signal. However, when the front vehicle 520 does not follow the signal, the threshold value is set to ten frames, and the front vehicle 520 may be set to be ultimately determined to cut out only when the continuous cut-out determination is made for ten frames. In this case, the manner for selecting the threshold value is not limited to a specific manner, but a user may properly select the threshold value if desired.

Figure 10A:
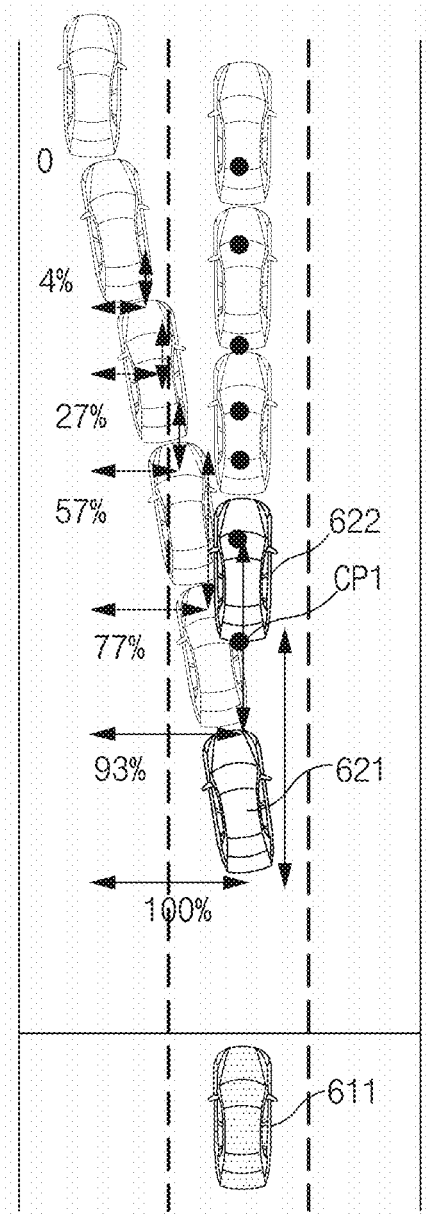
FIGS. 10A and 10B are views illustrating that an apparatus for controlling a vehicle calculates a reference point, according to an embodiment of the present disclosure.
Figure 10B:
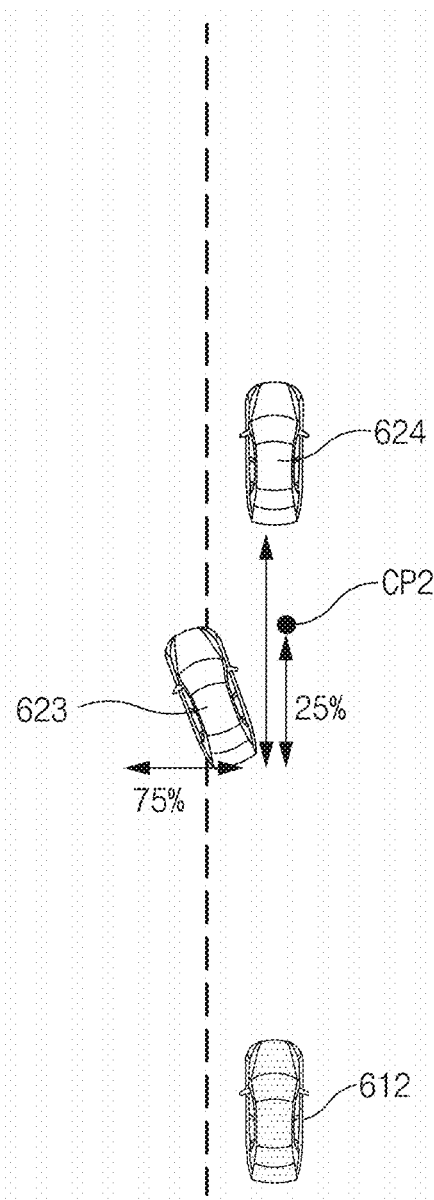

FIGS. 10A and 10B are views illustrating that an apparatus for controlling a vehicle calculates a control reference point, according to an embodiment of the present disclosure.

Referring to FIGS. 10A and 10B, control reference points "CP1" and "CP2" are calculated with respect to vehicles 621 and 622 in front of the vehicle 611 at a plurality of time points (or frames). In this case, the control reference points "CP1" and "CP2" refer to reference points to be considered to control the traveling of the vehicle 611 based on the cut-out object.

In detail, as illustrated in FIG. 10A, according to an embodiment of the present disclosure, on the assumption that an inter-center distance between the center of a traveling lane of the vehicle 611 on a traveling lane (second lane) of the vehicle 611, and the center of a target lane (first lane) to which the preceding vehicle 621 tries to cut out, is 100%, as the preceding vehicle 621 gradually cuts out of the traveling lane, the inter-center distance is gradually reduced from 100%. In this case, the vehicle control apparatus 130 may shift a position of a control reference point, which is positioned at the center of a rear bumper of a preceding vehicle 621 when the inter-center distance is 100%, to the vehicle 622 by a reduced ratio, as the preceding vehicle 621 gradually cuts out of the traveling lane.

For example, for an in-pass object on the traveling lane of the vehicle 611, a relevant control reference point may be the distance to the center of the rear bumper of the vehicle 621 or the vehicle 623, or may be the speed of the in-pass object. As described above, when the cut-out object is selected, a predicted position, which crosses a reference lane, of a predicted path has to be considered together with the current position of the cut-out object. Accordingly, it may be difficult to select a control reference point.

Therefore, according to an embodiment of the present disclosure, the vehicle control apparatus 130 has to select the control reference points "CP1" and "CP2" by considering the continuous change until a time point at which the cut-out object moves to a future target lane, while starting from an initial position. When the control reference points "CP1" and "CP2" are not considered to correspond to the cut-out, deceleration is suddenly made with respect to vehicles 622 and 624 in front of the preceding vehicles 621 and 623, as the preceding vehicles 621 and 623 cut out, thereby degrading the ride quality.

In particular, as illustrated in FIG. 10A, according to an embodiment of the present disclosure, the vehicle control apparatus 130 may calculate the control reference points "CP1" and "CP2" by considering a ratio (for example, 93%, 77%, or 27%) that the preceding vehicle 621 or 623 cuts out to a next lane. For example, the control reference points "CP1" and "CP2" may be set to be gradually away from the vehicle 611 on the current lane, as the vehicle 621 or 623, which cuts out of the current lane, is gradually away from the current lane.

In addition, as illustrated in FIGS. 10A and 10B, when the vehicle 622 or 624 is present in front of the preceding vehicle 621 or 623, the vehicle 622 or 624 is considered together, such that the control reference points "CP1" and "CP2" are calculated. A final control reference point may be calculated to a point which internally divides a line from a control reference point for the vehicle 622 or 624 in front of the preceding vehicle 621 or 623 and a control reference point for the preceding vehicle (or the cut-out vehicle) 621 or 623, based on a lateral deviation ratio that the preceding vehicle 621 or 623 laterally deviates from the current lane of the vehicle 611 or 621. For example, as illustrated in reference FIG. 10B, since the preceding vehicle 623 is still present on the lane on which the vehicle 612 travels, the lateral deviation ratio may be used to 75% and the control reference point "CP2" may be calculated by using the lateral deviation ratio of 25%.

Figure 11:
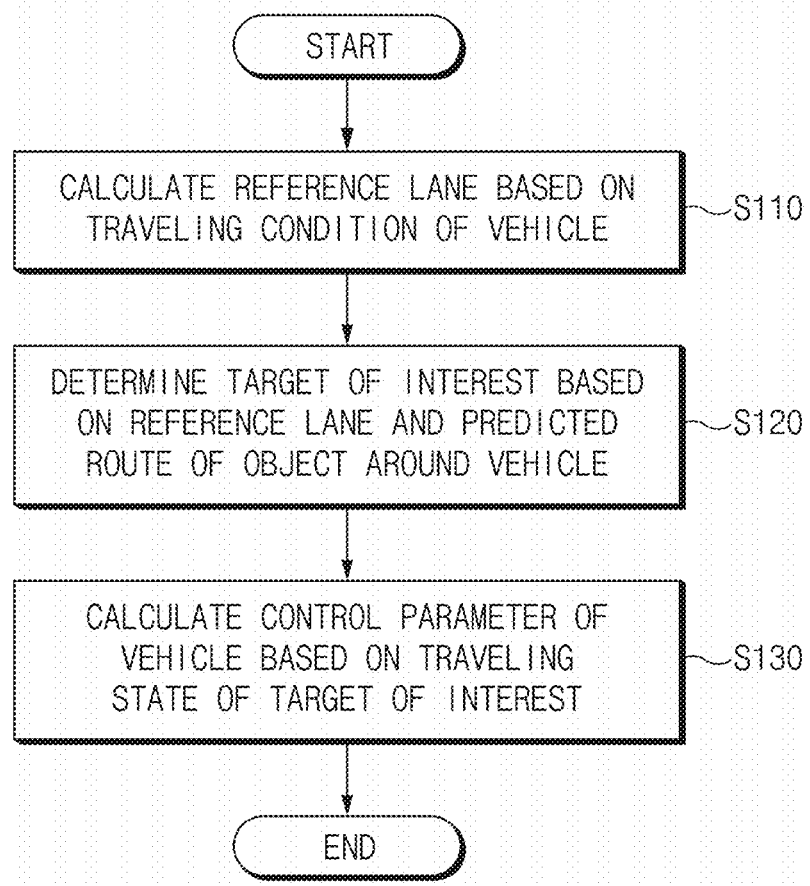
FIG. 11 is a flowchart illustrating a method for controlling a vehicle, according to an embodiment of the present disclosure.

Hereinafter, a method for controlling a vehicle is described in detail with reference to FIG. 11. FIG. 11 is a flowchart illustrating a method for controlling a vehicle, according to an embodiment of the present disclosure.

Hereinafter, it is assumed that the vehicle control apparatus 130 of FIG. 2 performs a processor of FIG. 11. In addition, in the following description made with reference to FIG. 11, it may be understood that the operation described as being performed by the vehicle control apparatus 130 is controlled by a processor of the vehicle control apparatus 130.

FIG. 11 is a flowchart illustrating a method for controlling a vehicle, according to an embodiment of the present disclosure.

Referring to FIG. 11, according to an embodiment of the present disclosure, the method for controlling the vehicle may include calculating a reference lane based on a traveling condition of a vehicle (S110). The reference lane may be calculated based on a first lane generated with a specific width based on a lanelink corresponding to the center of a vehicle, a second lane based on a laneside which is a lane on a map of an area in which the vehicle is traveling, and a third lane based on a traveling path of the vehicle.

For example, in S110, the reference lane may be calculated based on the laneside in a section uniform in a lane on which a vehicle is currently traveling, and may be calculated based on the lanelink in an irregular section in which the width of the lane, on which a vehicle is currently traveling, is greater than or smaller than a reference value, or the number of lanes is changed. When a path is changed like when the vehicle changes a lane, the reference lane may be calculated based on the traveling path of the vehicle.

In addition, the target of interest may be determined based on the reference lane and the predicted path of a surrounding object around the vehicle (S120). In addition, in S120, the target of interest may be determined by considering a predicted position of the vehicle which is traveling and a predicted position of the surrounding object after a specific time. For example, an object, which is within a specific distance from the traveling path of the vehicle, may be selected as a candidate object, and a target of interest may be determined based on the predicted path of the candidate object. In this case, an object (for example, the cut-out object) exerting an influence on the traveling path of the vehicle, when determined based on the predicted path, of candidate object adjacent to the traveling path of the vehicle, may be determined as the target of interest.

Further, in S120, the target of interest may be determined by considering cross information between predicted paths of objects around the vehicle. In other words, the target of interest may be determined by considering that predicted paths of objects overlap with each other, on the assumption that the objects are around the vehicle. For example, when the specific object tries to cut out of a lane and another object is traveling on a target lane for cutting out, the relevant object may stop cutting out to the target lane. As described above, the target of interest may be determined by considering predicted paths of a plurality of objects together. In addition, the target of interest may be determined based on information on a signal of a traffic light provided around the vehicle.

Next, a control parameter of a vehicle may be calculated based on a traveling state of the target of interest (S130). In this case, a speed of a vehicle and a point-level path of the vehicle may be calculated based on the traveling state of the target of interest. In detail, in S130, a control reference point for controlling the speed of the vehicle on the traveling path of the vehicle may be selected, and a control parameter (for example, a control parameter of a lateral speed) of the vehicle may be calculated based on the selected control reference point For example, the control reference point may be calculated based on a ratio that the target of interest deviates from the traveling path of the vehicle. In this case, the target of interest exerts a greater influence on the traveling of the vehicle, as the target of interest approaches the traveling path of the vehicle. Accordingly, as the target of interest deviates from the traveling path of the vehicle at a greater ratio, the control reference point is farther away from the vehicle.

Meanwhile, when a preceding object of the target of interest is present, the control parameter of the vehicle may be calculated based on a control reference point of the target of interest and a control reference point of the preceding object of the target of interest. For example, the control parameter may be calculated based on a point which internally divides a straight line from the control reference point of the target of interest to the control reference point of the preceding object of the target of interest.

In addition, in S130, the control parameter of the vehicle may be calculated based on the distance from the vehicle to the control reference point and a speed component of the object at the control reference point. In other words, the control parameter of the vehicle may be calculated by considering both the distance component and the speed component for the control reference point.

As described above, according to an embodiment of the present disclosure, in the method for controlling the vehicle, the virtual lane may be derived by effectively utilizing the laneside, the lanelink, and the control path, and the predicted paths and predicted positions of the surrounding objects may be compared to determine the target of interest, thereby more exactly determining the target and strongly coping with various road shapes and the traveling state of a surrounding vehicle.

In addition, according to another embodiment of the present disclosure, in the method for controlling the vehicle, the control point proportional to the ratio of cut-out in progression between the target of interest and the preceding vehicle may be calculated, thereby improving performance corresponding to the cut-out and improving ride quality with respect to the road having the random shape.

Figure 12:
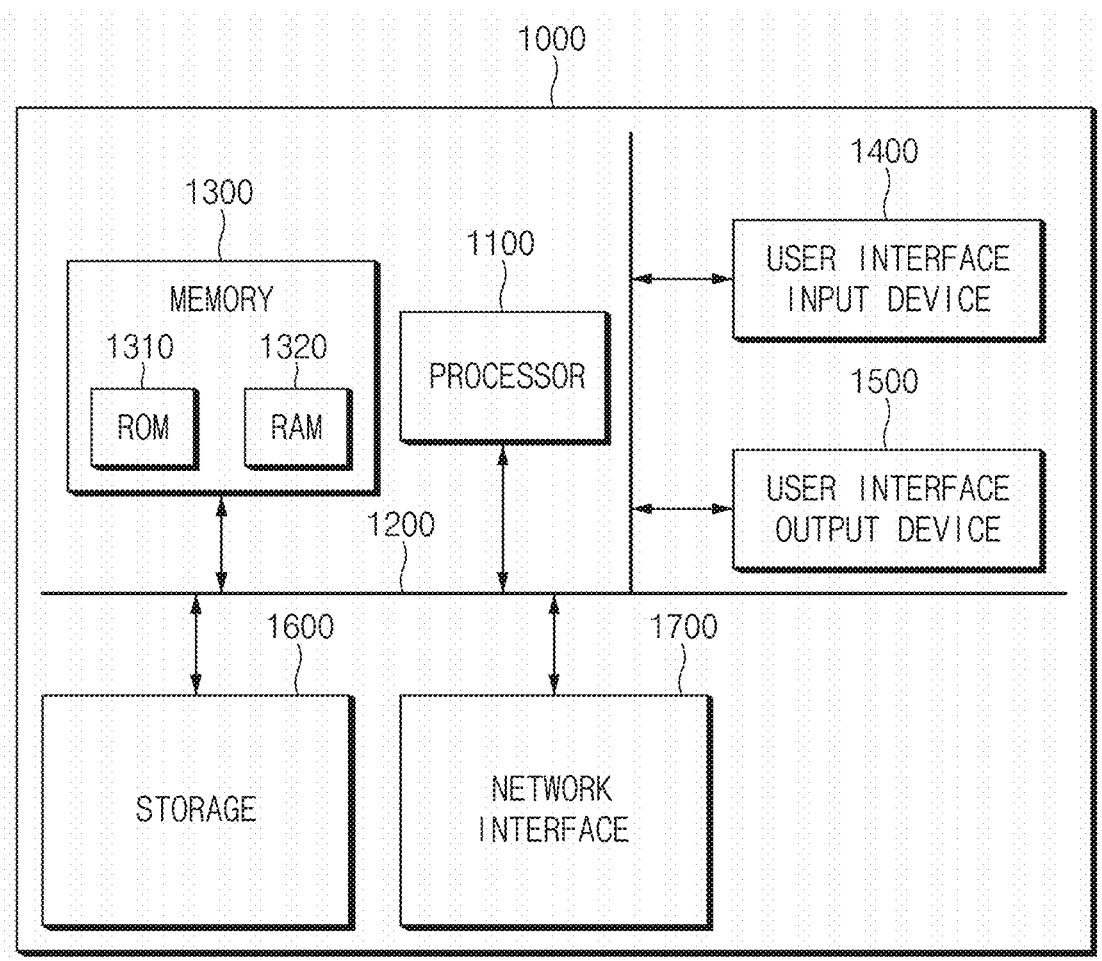
FIG. 12 is a block diagram illustrating a computing device according to an embodiment of the present disclosure.

FIG. 12 is a block diagram illustrating a computing device according to an embodiment of the present disclosure.

Referring to FIG. 12, a computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, according to an embodiment of the present disclosure, in the apparatus for controlling the vehicle, the system including the same, and the method for the same, the virtual lane may be derived by effectively utilizing the laneside, the lanelink, and the control path, and the predicted paths and predicted positions of the surrounding objects may be compared to determine the target of interest, thereby more exactly determining the target and strongly coping with various road shapes and the traveling state of a surrounding vehicle.

In addition, according to an embodiment of the present disclosure, in the apparatus for controlling the vehicle, the system including the same, and the method for the same, the control point proportional to the ratio of cut-out in progression between the target of interest and the preceding vehicle may be calculated, thereby improving performance corresponding to the cut-out and improving ride quality with respect to the road having the random shape.

Besides, a variety of effects directly or indirectly understood through the present disclosure may be provided.

Hereinabove, although the present disclosure has been described with reference to exemplary embodiments and the accompanying drawings, the present disclosure is not limited thereto, but may be variously modified and altered by those having ordinary skill in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments.

What is claimed is:

1. An apparatus for controlling a vehicle, the apparatus comprising:
   a memory; and
   a processor configured to:
   calculate a reference lane based on a laneside in a uniform section in a lane on which the vehicle is traveling;
   select objects within a specified distance from the reference lane as candidate objects;
   determine a target of interest based on cross information between predicted paths of the candidate objects;
   select a control reference point for controlling a speed of the vehicle on a traveling path of the vehicle, based on the target of interest; and
   calculate a control parameter of the vehicle, based on the selected control reference point,
   wherein the predicted paths of candidate objects are calculated based on a shape of a road where the vehicle is traveling, or a traveling state of a surrounding vehicle on the road,
   wherein the processor is further configured to:
   calculate the reference lane based on a lanelink in a section of the lane where a width of the lane is changed, or a section of the road where a number of lanes is changed; and
   calculate the reference lane based on the traveling path of the vehicle when the vehicle moves to another lane on the road,
   wherein the lanelink is a straight line extending in a traveling direction of the vehicle from a center of a bumper of the vehicle, and
   wherein the laneside is a lane formed on a map of an area in which the vehicle is traveling.

2. The apparatus of claim 1, wherein the processor is configured to calculate the reference lane based on at least one of a first lane generated to have a specific width, based on a lanelink, a second lane based on a laneside, or a third lane based on a traveling path of the vehicle,
   wherein the lanelink is a straight line extending in a traveling direction of the vehicle from a center of a bumper of the vehicle, and
   wherein the laneside is a lane formed on a map of an area in which the vehicle is traveling.

3. The apparatus of claim 1, wherein the target of interest includes a cut-out object which deviates from the reference lane.

4. The apparatus of claim 1, wherein the processor is further configured to determine the target of interest based on a predicted position of the vehicle after a specific time.

5. The apparatus of claim 1, wherein the processor is further configured to determine the target of interest, based on information on a signal of a traffic light provided around the vehicle.

6. The apparatus of claim 1, wherein the processor is further configured to calculate the control reference point based on a ratio that the target of interest deviates from the traveling path of the vehicle.

7. The apparatus of claim 1, wherein the processor is configured to shift the control reference point toward a preceding object of the target of interest, depending on a ratio that the target of interest enters a target lane, to which the target of interest cuts out, based on a center of a traveling lane of the vehicle and a center of the target lane.

8. The apparatus of claim 1, wherein the processor is further configured to calculate the control parameter of the vehicle, based on a control reference point of the target of interest and a control reference point of a preceding object of the target of interest.

9. The apparatus of claim 8, wherein the processor is further configured to calculate the control parameter, based on a point which internally divides a straight line from the control reference point of the target of interest to the control reference point of the preceding object of the target of interest.

10. The apparatus of claim 1, wherein, the processor is further configured to calculate the control parameter of the vehicle, based on a distance from the vehicle to the control reference point and a speed component of the target of interest at the control reference point.

11. The apparatus of claim 1, wherein the processor is further configured to generate a speed profile which is a set of target speeds of the vehicle at each time, based on the traveling state of the target of interest.

12. The apparatus of claim 1, wherein the processor is further configured to calculate a point-level path of a vehicle, based on the traveling state of the target of interest.

13. A vehicle system comprising:
    a memory; and
    a processor configured to:
    calculate a reference lane, based on surrounding objects around a vehicle, information on a position of the vehicle, and information on a map of the vehicle;
    select, among the surrounding objects, objects within a specified distance from the reference lane as candidate objects;

determine a target of interest based on cross information between predicted paths of the candidate objects;

select a control reference point for controlling a speed of the vehicle on a traveling path of the vehicle, based on the target of interest; and control the vehicle based on a control parameter of the vehicle, which is calculated based on the selected control reference point, wherein the predicted paths of candidate objects are calculated based on a shape of road where the vehicle is traveling, or a traveling state of a surrounding vehicle on the road, wherein the processor is further configured to:
 calculate the reference lane based on a laneside in a uniform section in a lane on which the vehicle is traveling;
 calculate the reference lane based on a lanelink in a section of the lane where a width of the lane is changed, or a section of the road where a number of lanes is changed; and
 calculate the reference lane based on a traveling path of the vehicle when the vehicle moves to another lane on the road, wherein the lanelink is a straight line extending in a traveling direction of the vehicle from a center of a bumper of the vehicle, and wherein the laneside is a lane formed on a map of an area in which the vehicle is traveling.

14. The vehicle system of claim 13, wherein the processor is configured to detect information on a traveling state of the vehicle.

15. The vehicle system of claim 13, wherein the processor is further configured to acquire the information on the position of the vehicle and the information on the map of the vehicle, from an external server.

16. A method for controlling a vehicle, the method comprising:
 calculating, by a processor, a reference lane;
 selecting, by the processor, objects within a specified distance from the reference lane as candidate objects;
 determining, by the processor, a target of interest based on cross information between predicted paths of the candidate objects;
 selecting, by the processor, a control reference point for controlling a speed of the vehicle on a traveling path of the vehicle, based on the target of interest; and
 calculating, by the processor, a control parameter of the vehicle based on the selected control reference point, wherein the predicted paths of candidate objects are calculated based on a shape of a road where the vehicle is traveling, or a traveling state of a surrounding vehicle on the road, wherein calculating the reference lane includes:
 calculating the reference lane based on a laneside in a uniform section in a lane on which the vehicle is traveling;
 calculating the reference lane based on a lanelink in a section of the lane where a width of the lane is changed, or a section of the road where a number of lanes is changed; and
 calculating the reference lane based on a traveling path of the vehicle when the vehicle moves to another lane on the road, wherein the lanelink is a straight line extending in a traveling direction of the vehicle—from a center of a bumper of the vehicle, and wherein the laneside is a lane formed on a map of an area in which the vehicle is traveling.

* * * * *